United States Patent [19]

Kikuchi

[11] Patent Number: 4,901,303

[45] Date of Patent: Feb. 13, 1990

[54] PHOTO-ELECTRO-MAGNETIC DISC DEVICE

[75] Inventor: Ikuya Kikuchi, Saitama, Japan

[73] Assignee: Pioneer Electronic Corporation, Tokyo, Japan

[21] Appl. No.: 226,905

[22] Filed: Aug. 1, 1988

[30] Foreign Application Priority Data

Jan. 25, 1988 [JP] Japan ................................ 63-7962[U]

[51] Int. Cl.$^4$ ............................................. G11B 13/04
[52] U.S. Cl. ..................... 369/112; 369/14; 369/291
[58] Field of Search ................ 369/13, 14, 15, 100, 369/112, 291; 360/114

[56] References Cited

U.S. PATENT DOCUMENTS

| | | | |
|---|---|---|---|
| 4,610,009 | 9/1986 | Connell | 369/14 |
| 4,837,758 | 6/1989 | Motoyama et al. | 369/292 |
| 4,843,600 | 6/1989 | Miyajima et al. | 369/13 |

FOREIGN PATENT DOCUMENTS

| | | | |
|---|---|---|---|
| 61-284801 | 12/1986 | Japan | 369/13 |
| 63-206937 | 8/1988 | Japan | 369/13 |

*Primary Examiner*—Donald McElheny, Jr.
*Attorney, Agent, or Firm*—Sughrue, Mion, Zinn, Macpeak & Seas

[57] ABSTRACT

A photo-electro-magnetic disc device has a photo-electro-magnetic disc accommodated in a disc cartridge load as a unit into cartridge holder loaded in the disc device. The cartridge holder with the end of a loading mechanism moves the disc onto a turn table. An optical head and a magnetic field applying part for recording data are loaded facing opposite sides of the disc. Magnetic members are provided on the same side of the disc as is the optical head and are connected to the cartridge holder which is made of magnetic material as to confront magnetic field applying part through the disc. A magnetic circuit which includes the disc is thus formed whereby the magnetic flux from the magnetic field applying part passes through the disc thereby providing a high magnetic field strength throughout the entire region of the disc to be irradiated by a light spot from the optical head.

4 Claims, 3 Drawing Sheets

PHOTO-ELECTRO-MAGNETIC DISC DEVICE

BACKGROUND OF THE INVENTION

This invention relates to a photo-electro-magnetic disc device.

In a photo-electro-magnetic disc device, data are recorded by locally heating a selected region with a spot of light while a magnetic field is applied to that local region, causing the magnetization of the local region to be orientated in the direction of the magnetic field.

A conventional photo-electro-magnetic disc device is illustrated in FIG. 1, wherein the photo-electromagnetic disc 1 is accommodated in a disc cartridge 2, and the disc 1 and the cartridge 2 are loaded, as one unit, in the device body. The cartridge 2 thus loaded is held by a cartridge holder 3. The cartridge holder 3, with the aid of a loading mechanism (not shown), moves the disc cartridge 2 into the device body and places the photo-electro-magnetic disc 1 on a turn table (not shown). The device has an optical head 5 for applying the light spot through an objective lens 4 to the photo-electro-magnetic disc 1 placed on the turn table, and magnetic field applying means 6 located on the side of the disc 1 which is opposite to the side facing the optical head 5. The magnetic field applying means 6 is made up of an E-shaped yoke 7 secured to the cartridge holder 3, and a coil 8 wound on the yoke 7. The magnetic field applying means 6 applies a magnetic field in predetermined direction to the part of the photo-electro-magnetic disc 1 to which the light spot is applied by the optical head 5. Further in FIG. 1, reference numeral 9 designates a frame.

The flow of magnetic flux formed by the magnetic field applying means 6 in the conventional device thus constructed extends from the center of the E-shaped yoke 7, and returns through the photo-electro-magnetic disc 1 to both ends of the E-shaped yoke 7. That is, as shown in FIG. 2, a magnetic circuit is formed substantially on one side of the photo-electro-magnetic disc 1. Therefore, the field strength may not be sufficiently high in the portions of the disc where the magnetic field need to be provided. Accordingly, in order to provide a sufficiently high magnetic field throughout the disc surface, it is necessary to provide a large coil and high power.

SUMMARY OF THE INVENTION

In view of the foregoing, an object of the invention is to provide a photo-electro-magnetic disc device in which a magnetic field sufficiently high in strength to magnetize the disc where needed can be applied to a photo-electro-magnetic disc without unduly increasing of the size of the coil or the electric power applied to the coil.

The foregoing object and other objects of the invention, which will be apparent from the following detailed description of the invention, have been achieved according to the teachings of the present invention by the provision of a photo-electro-magnetic disc device comprising: a cartridge holder adapted to hold a disc cartridge loaded therein, and to place a photo-electromagnetic disc on a turn table from the disc cartridge;.an optical head for applying a light spot to the photo-electro-magnetic disc placed on the turn table; and magnetic field applying means arranged on a side of the photo-electro-magnetic disc opposite the side facing the optical head, to apply a magnetic field in a predetermined direction to the part of the photo-electro-magnetic disc which is irradiated by the light spot, in which, according to the invention, magnetic members are so arranged as to confront through the photo-electro-magnetic disc with the magnetic field applying means, and the cartridge holder is made of magnetic material, the magnetic members being magnetically coupled to the magnetic field applying means through the cartridge holder.

The nature, principle and utility of the invention will become more apparent from the following detailed description when read in conjunction with the accompanying drawings.

DETAILED DESCRIPTION OF THE PREFERRED EMBODIMENTS

Preferred embodiments of this invention will be described with reference to the accompanying drawings.

Figure 1:
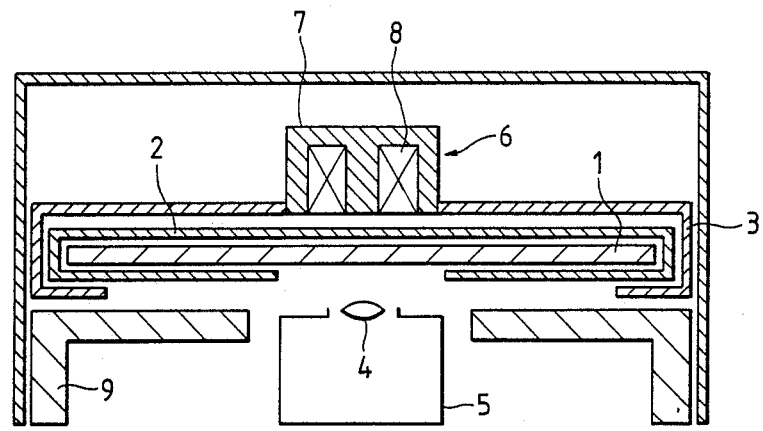
FIG. 1 is a sectional view showing a conventional photo-electro-magnetic disc device.
Figure 2:
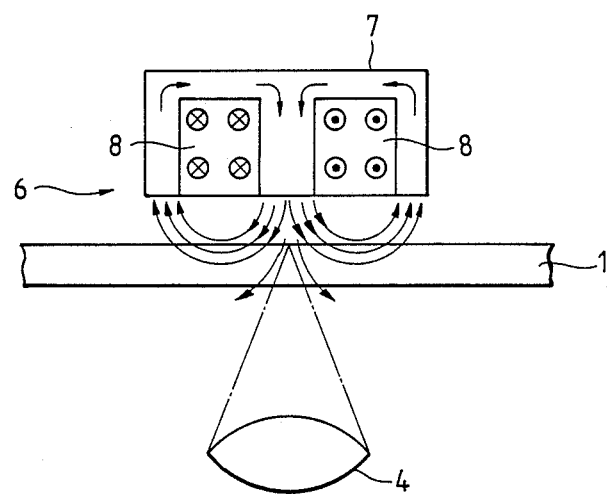
FIG. 2 is an explanatory diagram showing the flow of magnetic flux in the conventional device of FIG. 1.
Figure 3:
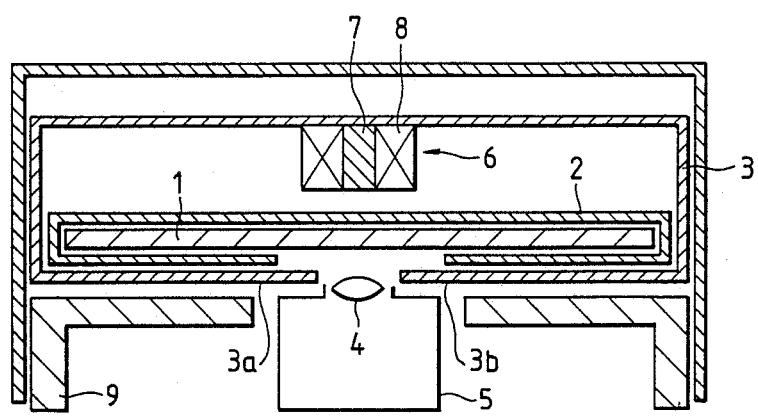
FIG. 3 is a sectional view showing one example of a photo-electro-magnetic disc device according to this invention.

A first example of a photo-electro-magnetic disc device according to the invention is shown in FIG. 3, in which those components which have been previously described with reference to FIG. 1 are designated by the same reference number.

The device, as shown in FIG. 3, comprises: a cartridge holder 3 which holds the disc cartridge 2 loaded in the device body and places the photo-electro-magnetic disc 1 on a turn table (not shown) from the disc cartridge 2. The cartridge holder 3 is made of a magnetic material, and comprises: lower surface holding parts 3a and 3b which are extended in such a manner that they confront magnetic field applying means 6 through the photo-electro-magnetic disc 1 and are not in the optical path of the irradiating light beam emitted by the optical head 5. Thus, the lower surface holding parts 3a and 3b of the cartridge holder 3 of the magnetic material are arranged, as magnetic members, on the side of the photo-electro-magnetic disc 1 opposite the side facing the magnetic field applying means 6. The magnetic field applying means 6 is made up of a bar-shaped yoke 7, and a coil 8 wound on the yoke 7.

Figure 4:
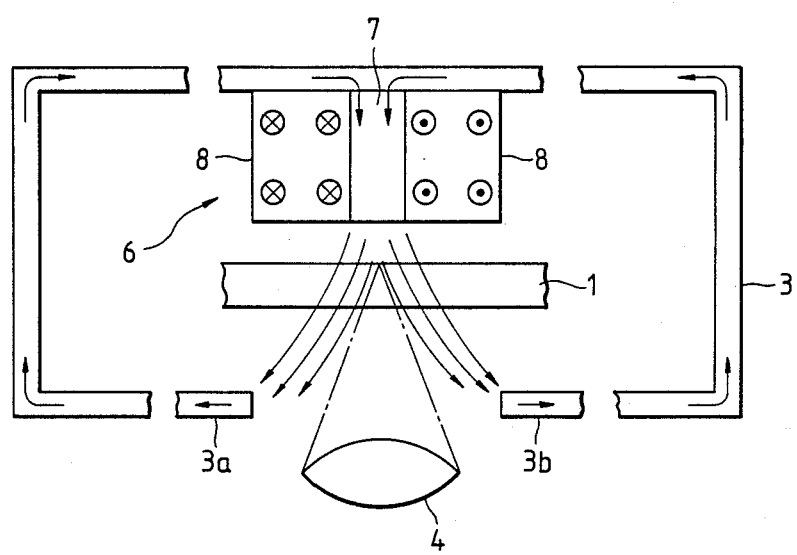
FIG. 4 is an explanatory diagram showing the flow of magnetic flux in the device shown in FIG. 3.

As was described above, the magnetic members (which are the lower surface holding parts 3a and 3b of the cartridge holder 3) and the magnetic field applying means 6 are arranged on opposite sides of the photo-electro-magnetic disc 1. As a result, as shown in FIG. 4, the magnetic flux extending from the yoke 7 passes through the disc 1, reaches the lower surface holding parts 3a and 3b of the cartridge holder 3, and returns to the yoke 7 through the cartridge holder 3, thereby forming, a magnetic circuit which includes the disc 1.

Accordingly, for the disc surface requiring a magnetic field, a sufficiently high magnetic field can be provided without increasing of the size of the coil 8 or the electric power applied to the coil 8.

Figure 5:
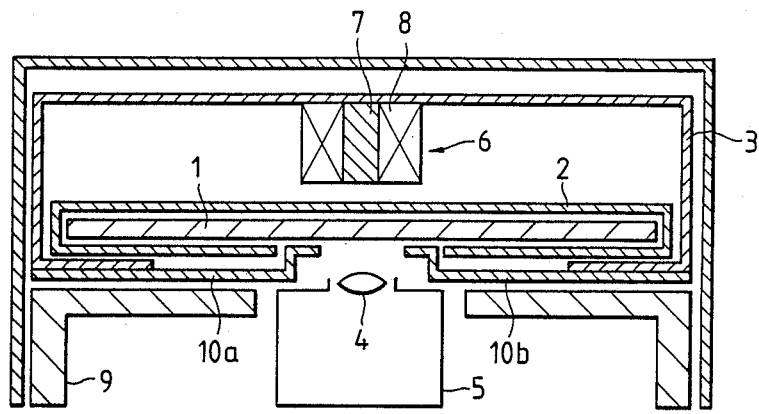
FIG. 5 is a sectional view showing one modification of the photo-electro-magnetic disc device shown in FIG. 3.
Figure 6:
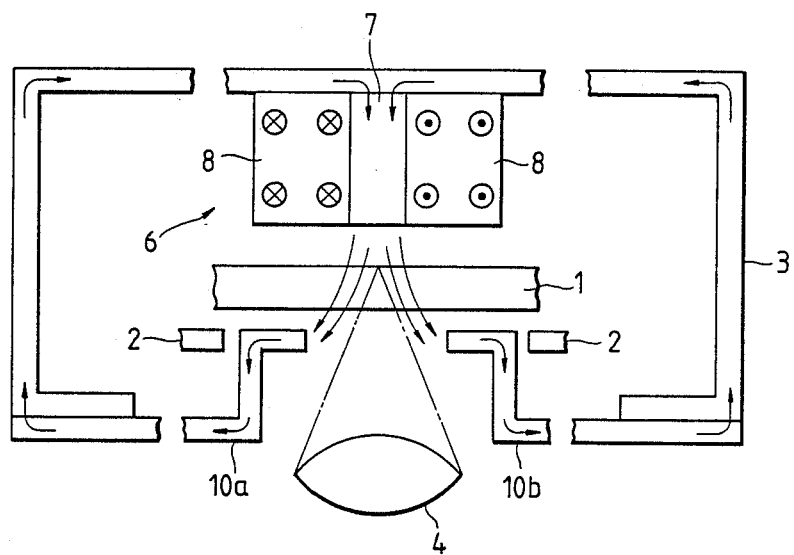
FIG. 6 is an explanatory diagram showing the flow of magnetic flux in the device shown in FIG. 5.

In the above-described device, the lower surface holding parts 3a and 3b of the cartridge holder 3 are used as the magnetic members which confront the magnetic field applying means 6 through the disc 1. However, it goes without saying that, as shown in FIG. 5, magnetic members 10a and 10b provided separately from the cartridge holder may be magnetically combined with the cartridge holder 3. In this modification the magnetic members 10a and 10b may have any desired configuration, allowing them to be set close to the photo-electro-magnetic disc 1 as shown in FIG. 5. Therefore, as is apparent from the flow of magnetic flux shown in FIG. 6, the magnetic flux can be increased in density at the part of the disc 1 which is irradiated by the light spot. Thus, the device shown in FIG. 5 is more advantageous than that shown in FIG. 3.

As described above, in the photo-electro-magnetic disc device of the invention, the magnetic members are so arranged as to confront, through the photo-electro magnetic disc, the magnetic field applying means, and the magnetic members are magnetically coupled to the magnetic field applying means through the cartridge holder, so that a magnetic circuit is formed in such a manner that it includes the photo-electro-magnetic disc. Therefore, a magnetic field sufficiently high in field strength can be applied to the part of the photo-electro-magnetic disc which is irradiated by the light spot, without increasing the size of the coil or the electric power applied to the coil.

What is claimed:

1. A photo-electro-magnetic disc device comprising:
   a cartridge holder adapted to hold a disc cartridge containing a photo-electro-magnetic disc, loaded therein, and to place said photo-electro-magnetic disc on a turn table;
   an optical head for applying a light spot to said photo-electro-magnetic disc placed on said turn table; and
   magnetic field applying means, arranged on one side of said photo-electro-magnetic disc on the other side of which said optical head is provided, for applying a magnetic field in a predetermined direction to the part of said photo-electro-magnetic disc which is irradiated by said light spot, the improvement comprising:
   magnetic members arranged as to confront said magnetic field applying means through said photo-electromagnetic disc, wherein;
   said cartridge holder is made of magnetic material, and
   said magnetic members are magnetically coupled to said magnetic field applying means through said cartridge holder.

2. A photo-electro-magnetic disc device in claim 1, wherein said magnetic members are integral with said cartridge holder of magnetic material.

3. A photo-electro-magnetic disc device comprising:
   a cartridge holder adapted to hold a disc cartridge containing a photo-electro-magnetic disc, loaded therein, and to place said photo-electro-magnetic disc on a turn table;
   an optical head for applying light spot to said photo-electro-magnetic disc placed on said turn table;
   magnetic field applying means magnetically coupled to said cartridge holder and arranged on one side of said photo-electro-magnetic disc on the other side of which said optical head is provided, for applying magnetic field in a predetermined direction to the part of said photo-electro-magnetic disc which is irradiated by said light spot, the improvement comprises:
   said cartridge holder comprising a magnetic material, and magnetic members, magnetically coupled to said cartridge holder and confronting said magnetic field applying means through said disc;
   whereby a magnetic circuit is formed which includes said disc such that magnetic flux from said magnetic field applying means extends therefrom through said disc, said magnetic members, said cartridge holder and back to said magnetic field applying means.

4. The photo-electro-magnetic disc device of claim 3 wherein said magnetic members are extensions of and integral with said cartridge holder.

* * * * *